United States Patent
Ooto et al.

(10) Patent No.: US 8,502,489 B2
(45) Date of Patent: Aug. 6, 2013

(54) MOTOR CONTROL DEVICE

(75) Inventors: Hisashi Ooto, Osaka (JP); Taro Kishibe, Hyogo (JP); Hiroshi Ozaki, Nara (JP); Ryuhei Watabe, Hyogo (JP); Satoru Doi, Hyogo (JP)

(73) Assignee: Panasonic Corporation, Osaka (JP)

( * ) Notice: Subject to any disclaimer, the term of this patent is extended or adjusted under 35 U.S.C. 154(b) by 329 days.

(21) Appl. No.: 13/124,021

(22) PCT Filed: Oct. 13, 2009

(86) PCT No.: PCT/JP2009/005308
§ 371 (c)(1),
(2), (4) Date: Apr. 13, 2011

(87) PCT Pub. No.: WO2010/044243
PCT Pub. Date: Apr. 22, 2010

(65) Prior Publication Data
US 2011/0199035 A1    Aug. 18, 2011

(30) Foreign Application Priority Data
Oct. 15, 2008   (JP) ................... 2008-265994

(51) Int. Cl.
*H02P 3/06* (2006.01)
*E05F 15/20* (2006.01)

(52) U.S. Cl.
CPC ..................... *E05F 15/20* (2013.01)
USPC ............ 318/478; 318/445; 318/810; 318/811

(58) Field of Classification Search
CPC ....................................... E05F 15/20
USPC ................. 318/478, 445, 810–811
See application file for complete search history.

(56) References Cited

U.S. PATENT DOCUMENTS
6,056,088 A * 5/2000 Gerstenkorn ................. 187/390

FOREIGN PATENT DOCUMENTS
| JP | 04-085282 A | 3/1992 |
| JP | 04-085283 A | 3/1992 |
| JP | 2004-237903 A | 8/2004 |
| JP | 2006-268130 A | 10/2006 |

OTHER PUBLICATIONS
International Search Report for International Application No. PCT/JP2009/005308, dated Jan. 19, 2010, 1 page.

* cited by examiner

*Primary Examiner* — Bentsu Ro
*Assistant Examiner* — David Luo
(74) *Attorney, Agent, or Firm* — Brinks Hofer Gilson & Lione

(57) ABSTRACT

A motor control device, which receives at least two emergency stop signals, includes an LSI, a PWM signal transmission circuit, a drive circuit, and an inverter circuit. The LSI generates PWM signals. The PWM signal transmission circuit transmits the PWM signals. The drive circuit generates inverter drive signals. The inverter circuit includes a P-side power switching device and an N-side power switching device. The drive circuit includes a P-side drive circuit for driving the P-side power switching device, and an N-side drive circuit for driving the N-side power switching device. One of the emergency stop signals is inputted to the P-side drive circuit and the PWM signal transmission circuit. The other emergency stop signal is inputted to the N-side drive circuit and the PWM signal transmission circuit. In response to the receipt of an emergency stop signal, the PWM signal transmission circuit stops transmitting the PWM signals, and the drive circuit stops outputting the inverter drive signals.

3 Claims, 2 Drawing Sheets

MOTOR CONTROL DEVICE

TECHNICAL FIELD

The present invention relates to a motor control device which has an emergency stop function to stop power to a motor by using emergency stop signals.

BACKGROUND ART

Motor control devices generally include a control circuit for controlling the speed and position of a motor, a rectifying circuit for converting AC power to DC power, and a drive circuit for supplying electric current to the drive motor. The drive circuit supplies power to the motor by switching its power transistors on and off.

In conventional motor control devices having an emergency stop function, when an emergency stop signal is received, the drive circuit stops outputting an on-off signal to the power transistors. As a result, the power transistors stop power to the motor so as to emergency-stop the motor.

In a robot control system or other equipment where such a motor control device is installed, an emergency stop can be activated as follows. First, the control circuit in such system or equipment determines whether an emergency stop signal has been received. Then, the control circuit controls the motor control device to stop transmitting a motion command to the motor if necessary, so as to emergency-stop the motor.

There has been proposed a technique for reducing the risk of failure of an emergency stop circuit in a motor control device (see, e.g., Patent Literature 1). Such a conventional emergency stop circuit includes two emergency stop signals. These emergency stop signals are inputted to respective CPUs (central processing units) which check the consistency between these signals. The emergency stop circuit stops a gate drive signal based on the checking result so as to emergency-stop the motor. Thus, the conventional emergency stop circuit has improved its safety performance by having two emergency stop signals.

In spite of having two paths of emergency stop signals, the conventional emergency stop circuit has only one shut-off function to shut off the motor. This means that when the shut-off function itself breaks down, the motor may not be successfully emergency-stopped.

Furthermore, the conventional emergency stop circuit requires a complex software process because the CPUs are disposed between a plurality of circuits for transmitting the emergency stop signals. Therefore, when the software has a problem, received emergency stop signals may not be processed properly.

Since the conventional emergency stop circuit stops power to the motor by the software process by the CPUs, the emergency stop signals are checked at time intervals determined by a software program. This causes a delay in responding to emergency situations by the time intervals.

Thus, if the emergency stop function in the conventional motor control device breaks down, this may cause the motor to continue to rotate against the user's intention. To avoid such a consequence, much safer motor control devices have been required.

Patent Literature 1: Japanese Patent Unexamined Publication No.2006-268130

SUMMARY OF THE INVENTION

The present invention is directed to provide a motor control device which has input ports for receiving at least two emergency stop signals, and drive-controls a motor based on PWM signals. The motor control device includes an LSI for generating PWM signals; a PWM signal transmission circuit for transmitting the PWM signals generated by the LSI; a drive circuit for generating inverter drive signals based on the PWM signals transmitted from the PWM signal transmission circuit; and an inverter circuit including a P-side power switching device and an N-side power switching device, and generating motor drive signals based on the inverter drive signals, the motor drive signals being applied to each phase winding of the motor. The drive circuit includes a P-side drive circuit for driving the P-side power switching device, and an N-side drive circuit for driving the N-side power switching device. One of the emergency stop signals is inputted to the P-side drive circuit and the PWM signal transmission circuit. The other emergency stop signal is inputted to the N-side drive circuit and the PWM signal transmission circuit. In response to the receipt of an emergency stop signal, the PWM signal transmission circuit stops transmitting the PWM signals, and the drive circuit stops outputting the inverter drive signals.

With this structure, the motor control device has a plurality of shut-off functions for the motor, in addition to a plurality of emergency stop signals received through a plurality of input ports. For example, two emergency stop signals can be separately supplied to the P-side drive circuit, the N-side drive circuit, and the PWM signal transfer circuit. These circuits operate to stop power to the motor in response to the emergency stop signals. Thus, the motor control device can stop the power to the motor by using one of the shut-off functions in response to either one of the emergency stop signals. This reduces the risk of failure of the emergency-stop operation, making the motor control device of the present invention safer due to the reliable emergency stop function.

DETAILED DESCRIPTION OF THE PREFERRED EMBODIMENTS

The motor control device of the present invention will be described as follows with reference to accompanying drawings.

First Exemplary Embodiment

Figure 1:
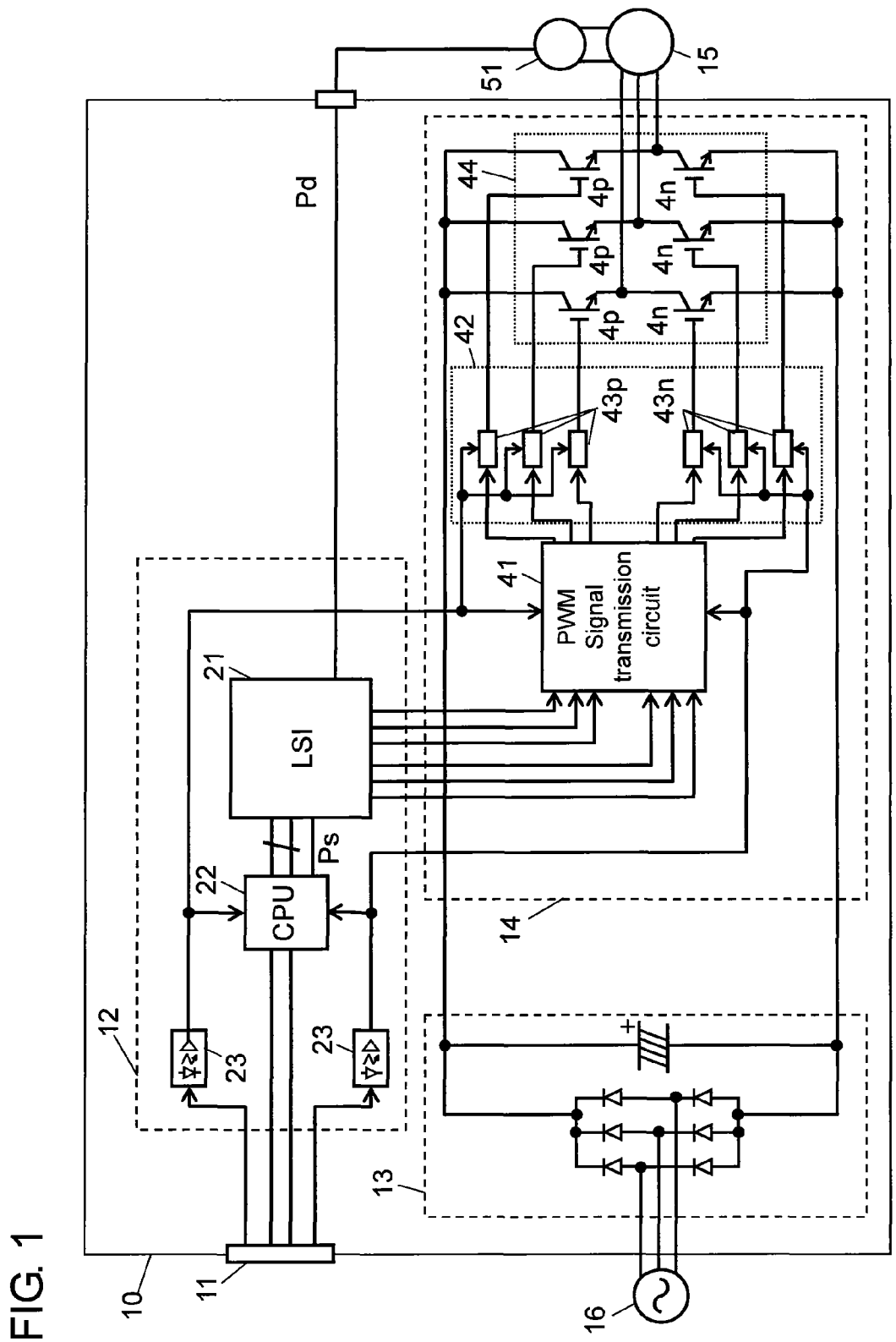
FIG. 1 is a block diagram showing the structure of a motor control device according to a first exemplary embodiment of the present invention.

FIG. 1 is a block diagram showing the structure of a motor control device according to a first exemplary embodiment of the present invention.

As shown in FIG. 1, motor control device 10 includes control circuit 12, rectifying circuit 13, and drive circuit 14. Motor control device 10 is connected to motor 15 so as to drive it and to control its rotation. Control circuit 12 generates signals required for drive-controlling motor 15. Control circuit 12 also controls each component of motor control device 10. Rectifying circuit 13 converts AC power supplied from power supply 16 to DC power, and supplies the DC power to drive circuit 14. Drive circuit 14 generates motor drive signals for driving motor 15 based on the signals from control circuit 12, and transmits the motor drive signals to motor 15. Drive circuit 14 generates the motor drive signals by the DC power supplied from rectifying circuit 13.

In the present exemplary embodiment, motor 15 has three phase windings of U, V, and W phases. Motor 15 is driven by the phase windings being applied with the motor drive signals which have waveforms corresponding to the respective phases. The waveforms have a phase difference of, e.g., 120 degrees between them.

Motor control device 10 further includes I/F (interface) connector 11 as an input port for transmitting and receiving signals to/from external devices. The pins of I/F connector 11 are assigned with respective functions, and are connected to the circuit components of control circuit 12 according to the assigned functions. I/F connector 11 receives, e.g., command signals containing commands indicating the speed and position of the rotation, and emergency stop signals from outside. As mentioned above, the emergency stop signals are used to emergency-stop motor 15. Motor control device 10 receives two emergency stop signals in the present exemplary embodiment, but may receive a larger number of emergency stop signals.

Control circuit 12 includes LSI (Large Scale Integrated circuit) 21, CPU (Central Processing Unit) 22, and two emergency stop transfer circuits 23.

Emergency stop transfer circuits 23 buffer the emergency stop signals inputted to I/F connector 11, and then transmit the buffered emergency stop signals to CPU 22 and drive circuit 14. Emergency stop transfer circuits 23 each include a photo-coupler, a CR filter, and a buffer IC. The emergency stop signals are supplied to motor control device 10 via emergency stop transfer circuits 23 in the present exemplary embodiment. This reduces the effect of noise and increases the reliability of the emergency stop signals.

CPU 22, which can be a microprocessor, transmits and receives various signals, and also monitors each circuit of motor control device 10 and the emergency stop signals.

LSI 21, which is an integrated circuit having a plurality of circuits, controls the rotation of motor 15 such as its speed and position. To achieve such control, motor 15 includes encoder 51 for detecting the rotational position of motor 15. The positional information detected by encoder 51 is transmitted as detected positional information Pd to LSI 21. LSI 21 also receives a position command Ps via CPU 22 according to a position command signal inputted to I/F connector 11. LSI 21 performs feedback control so that the rotational position of motor 15 agrees with the position command Ps, based on the detected positional information Pd and the position command Ps received from CPU 22. The feedback control may also control the speed of motor 15.

To perform the feedback control, LSI 21 generates waveform signals having waveforms to be applied to the phase windings of motor 15, and then generates six PWM signals by pulse-width modulating (PWM) the waveform signals. The six PWM signals can be divided into three phases and further divided into two sides: P side and N side as will be described later. LSI 21 supplies the six PWM signals to drive circuit 14.

As described above, CPU 22 also works as an emergency stop monitor unit for monitoring the two emergency stop signals. In response to the receipt of an emergency stop signal, CPU 22 controls LSI 21 to stop generating the PWM signals.

Drive circuit 14 includes PWM signal transmission circuit 41, inverter drive circuit 42, and inverter circuit 44.

Inverter circuit 44 generates three-phase motor drive signals based on the PWM signals, and drives motor 15 using the motor drive signals. To generate the motor drive signals, inverter circuit 44 includes three pairs of positive and negative power switching devices, that is, a total of six power switching devices. FIG. 1 includes three P-side power switching devices 4p connected to the positive side (P side) of the DC power supplied from rectifying circuit 13, and three N-side power switching devices 4n connected to the negative side (N side) of the DC power. Power switching devices 4p and 4n are respectively switched on and off based on the PWM signals, thereby generating the motor drive signals. The motor drive signals drive motor 15. To switch power switching devices 4p and 4n on and off, the PWM signals generated by LSI 21 are transmitted to inverter circuit 44 via PWM signal transmission circuit 41 and inverter drive circuit 42. The transmitted PWM signals are supplied as inverter drive signals from inverter drive circuit 42 to power switching devices 4p and 4n.

PWM signal transmission circuit 41 transmits the PWM signals supplied from LSI 21 to inverter drive circuit 42. Furthermore, PWM signal transmission circuit 41 receives the emergency stop signals from emergency stop transfer circuits 23. In response to the receipt of at least one of the two emergency stop signals, PWM signal transmission circuit 41 stops transmitting the PWM signals to inverter drive circuit 42.

Inverter drive circuit 42 generates the inverter drive signals for switching power switching devices 4p and 4n on and off based on the PWM signals received from LSI 21. Inverter drive circuit 42 includes P-side drive circuits 43p for driving three P-side power switching devices 4p, and N-side drive circuits 43n for driving three N-side power switching devices 4n. P-side drive circuits 43p receive one of the two emergency stop signals from one of emergency stop transfer circuits 23. N-side drive circuits 43n receive the other emergency stop signal from the other emergency stop transfer circuit 23. In response to the receipt of the emergency stop signals, P-side and N-side drive circuits 43p and 43n stop generating the inverter drive signals.

The following is a description of the operation of motor control device 10 having the above-described structure, mainly considering the emergency stop function.

I/F connector 11 uses two of its pins as input ports for the emergency stop signals. The two emergency stop signals supplied to I/F connector 11 are independently transmitted to drive circuit 14 via emergency stop transfer circuits 23. In addition, CPU 22 monitors the presence of the emergency stop signals.

The two emergency stop signals are separately connected to the dedicated terminals of PWM signal transmission circuit 41 of drive circuit 14. One of the two emergency stop signals is connected to P-side drive circuits 43p, and the other is connected to N-side drive circuits 43n.

Thus, in motor control device 10, one of the emergency stop signals is inputted to P-side drive circuits 43p and PWM signal transmission circuit 41, and the other emergency stop signal is inputted to N-side drive circuits 43n and PWM signal transmission circuit 41. CPU 22, which monitors the two emergency stop signals, controls LSI 21 to stop generating the PWM signals in response to the receipt of an emergency stop signal.

When the two input ports of I/F connector 11 receive emergency stop signals, PWM signal transmission circuit 41, P-side drive circuits 43p, and N-side drive circuits 43n are requested to perform an emergency stop. As a result, P-side drive circuits 43p and/or N-side drive circuits 43n stop generating and transmitting the inverter drive signals. Inverter circuit 44, which drives motor 15 using a three-phase PWM control method, stops power to motor 15 when P-side power switching devices 4p and/or N-side power switching devices 4n stop switching. In other words, when P-side drive circuits 43p and/or N-side drive circuits 43n stop generating the inverter drive signals, inverter circuit 44 stops switching. This results in stopping power to motor 15. These operations act as a shut-off function for motor 15 to stop its rotation.

When requested to perform an emergency stop, PWM signal transmission circuit 41 stops transmitting the PWM signals. As a result, inverter drive circuit 42 does not output the inverter drive signals, and inverter circuit 44 stops switching. These operations also stop power to motor 15, and act as another shut-off function for motor 15 to stop its rotation.

In addition, CPU 22 makes LSI 21 stop generating the PWM signals. As a result, inverter drive circuit 42 does not receive the PWM signals, and hence does not output the inverter drive signals. Then, inverter circuit 44 stops switching. These operations also stop power to motor 15, and act as another shut-off function for motor 15 to stop its rotation.

As described hereinbefore, motor control device 10 in the present exemplary embodiment has two paths of emergency stop signals, and when at least one of the two emergency stop signals is effective, the motor can be emergency-stopped. With the two emergency stop signals, motor 15 can be emergency-stopped by stopping at least one of the following: the generation of the PWM signals by LSI 21; the transmission of the PWM signals by PWM signal transmission circuit 41; and the generation of the inverter drive signals by inverter drive circuit 42. Thus, the present exemplary embodiment has a plurality of shut-off functions for motor 15. Even if one function breaks down, the other functions allow the motor to emergency-stop, thereby reducing the risk of failure of the emergency-stop operation of the motor control device. Furthermore, motor 15 is emergency-stopped by the function responded most quickly of all the shut-off functions, thereby increasing the response speed of the emergency stop function.

One of the two emergency stop signals is connected to P-side drive circuits 43p, and the other is connected to N-side drive circuits 43n in the present exemplary embodiment. As mentioned above, power to motor 15 can be stopped by stopping the switching of P-side power switching devices 4p and/or N-side power switching devices 4n of inverter circuit 44. Thus, motor 15 can be emergency-stopped by the ones that have responded more quickly of P-side drive circuits 43p and N-side drive circuits 43n, thereby increasing the response speed of emergency stop function.

Thus, in the present exemplary embodiment, power to the motor can be stopped by using one of the shut-off functions in response to the receipt of either one of the emergency stop signals. As a result, the motor control device has an emergency stop function with a high response speed, and the emergency-stop operation with a low risk of failure.

Second Exemplary Embodiment

Figure 2:
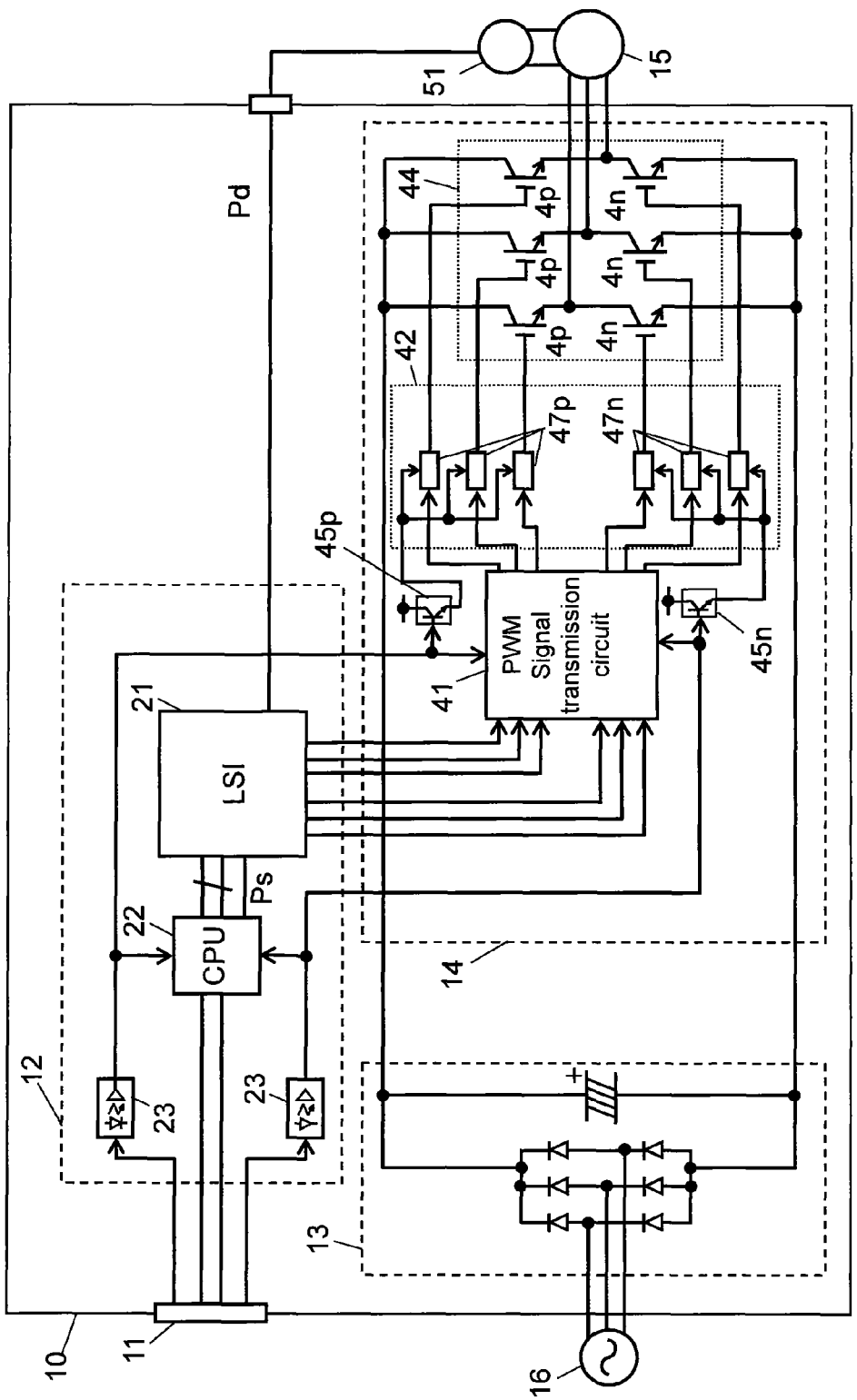
FIG. 2 is a block diagram showing the structure of a motor control device according to a second exemplary embodiment of the present invention.

FIG. 2 is a block diagram showing the structure of a motor control device according to a second exemplary embodiment of the present invention.

Motor control device 10 of the present exemplary embodiment differs from motor control device 10 of the first exemplary embodiment in having P-side power-off circuit 45p and N-side power-off circuit 45n. P-side power-off circuit 45p is connected to P-side drive circuits 47p. N-side power-off circuit 45n is connected to N-side drive circuits 47n. Components identical to those in the first exemplary embodiment are denoted by the same reference numerals, and hence the description thereof will be omitted.

In FIG. 2, P-side power-off circuit 45p, which is composed of a transistor, turns on and off the power to P-side drive circuits 47p. P-side power-off circuit 45p is connected to one of the emergency stop signals. In response to the receipt of the emergency stop signal, P-side power-off circuit 45p stops power to P-side drive circuits 47p. Similar to P-side drive circuits 43p shown in the first exemplary embodiment, P-side drive circuits 4'7p have the function of generating the inverter drive signals. When P-side power-off circuit 45p stops power to P-side drive circuits 47p, P-side drive circuits 47p stop generating the inverter drive signals.

N-side power-off circuit 45n, which is composed of a transistor, turns on and off the power to N-side drive circuits 47n. N-side power-off circuit 45n is connected to the other emergency stop signal. In response to the receipt of the emergency stop signal, N-side power-off circuit 45n stops power to N-side drive circuits 47n. Similar to N-side drive circuits 43n shown in the first exemplary embodiment, N-side drive circuits 47n have the function of generating the inverter drive signals. When N-side power-off circuit 45n stops power to N-side drive circuits 47n, N-side drive circuits 47n stop generating the inverter drive signals.

Using P-side and N-side power-off circuit 45p and 45n makes it unnecessary to provide the function of stopping the generation of the inverter drive signals, which is included in P-side and N-side drive circuits 43p and 43n described in the first exemplary embodiment. This structure eliminates the use of the element for realizing the function of stopping the generation of the inverter drive signals, thereby providing the circuits with a higher degree of freedom in design.

As described hereinbefore, in the motor control device of the present invention, one of the emergency stop signals is inputted to either P-side drive circuits or P-side power-off circuit and to PWM signal transmission circuit. The other emergency stop signal is inputted to either N-side drive circuits or N-side power-off circuit and to PWM signal transmission circuit. In addition, CPU monitors the two emergency stop signals, and controls the LSI to stop generating the PWM signals in response to the receipt of the emergency stop signals. Thus, the motor control device of the present invention has a plurality of shut-off functions for the motor in addition to a plurality of emergency stop signals received through a plurality of input ports.

The motor control device of the present invention can stop power to the motor by using one of the shut-off functions in response to the receipt of either one of the emergency stop signals. This increases the response speed of the emergency stop function and reduces the risk of failure of the emergency-stop operation. As a result, the motor control device is safer due to the reliable emergency stop function.

Industrial Applicability

The motor control device of the present invention can improve reliability and safety of the emergency stop function of an apparatus on which it is mounted. Thus, the motor control device is useful for industrial and other motors requiring high safety.

Reference Marks in the Drawings

4p P-side power switching device
4n N-side power switching device
10 motor control device
11 I/F connector
12 control circuit
13 rectifying circuit
14 drive circuit
15 motor
16 power supply
21 LSI
22 CPU
23 emergency stop transfer circuit
41 PWM signal transmission circuit
42 inverter drive circuit
43p, 47p P-side drive circuit
43n, 47n N-side drive circuit
44 inverter circuit 45*p* P-side power-off circuit
45*n* N-side power-off circuit
51 encoder

The invention claimed is:

1. A motor control device having input ports for receiving at least two emergency stop signals, and drive-controlling a motor based on PWM signals, the motor control device comprising:
   an LSI for generating the PWM signals;
   a PWM signal transmission circuit for transmitting the PWM signals generated by the LSI;
   a drive circuit for generating inverter drive signals based on the PWM signals transmitted from the PWM signal transmission circuit; and
   an inverter circuit having a P-side power switching device and an N-side power switching device, the inverter circuit generating motor drive signals based on the inverter drive signals, the motor drive signals being applied to individual phase windings of the motor, wherein
   the drive circuit includes a P-side drive circuit for driving the P-side power switching device and an N-side drive circuit for driving the N-side power switching device;
   one of the emergency stop signals is inputted to the P-side drive circuit and the PWM signal transmission circuit;
   another of the emergency stop signals is inputted to the N-side drive circuit and the PWM signal transmission circuit;
   the PWM signal transmission circuit stops transmitting the PWM signals in response to receipt of any of the emergency stop signals; and
   the drive circuit stops outputting the inverter drive signals in response to the receipt of any of the emergency stop signals.

2. The motor control device of claim 1, further comprising:
   an emergency stop monitor unit for monitoring the emergency stop signals, and controlling the LSI to stop generating the PWM signals in response to any of the emergency stop signals.

3. The motor control device of claim 1, further comprising:
   a P-side power-off circuit for stopping power to the P-side drive circuit in response to one of the emergency stop signals; and
   an N-side power-off circuit for stopping power to the N-side drive circuit in response to another of the emergency stop signals.

* * * * *